US012806992B2

(12) United States Patent
Babayev et al.

(10) Patent No.: US 12,806,992 B2
(45) Date of Patent: Nov. 24, 2026

(54) GASEOUS FUEL STORAGE ARRANGEMENT

(71) Applicant: Volvo Truck Corporation, Gothenburg (SE)

(72) Inventors: Rafig Babayev, Gothenburg (SE); Vijai Shankar Bhavani Shankar, Gothenburg (SE)

(73) Assignee: Volvo Truck Corporation, Gothenburg (SE)

(*) Notice: Subject to any disclaimer, the term of this patent is extended or adjusted under 35 U.S.C. 154(b) by 52 days.

(21) Appl. No.: 18/965,270

(22) Filed: Dec. 2, 2024

(65) Prior Publication Data

US 2025/0196620 A1 Jun. 19, 2025

(30) Foreign Application Priority Data

Dec. 13, 2023 (EP) .................................... 23216338

(51) Int. Cl.
*B60K 15/03* (2006.01)

(52) U.S. Cl.
CPC ................... *B60K 15/03006* (2013.01); *B60K 2015/03296* (2013.01); *B60K 2015/03315* (2013.01)

(58) Field of Classification Search
CPC ........... B60K 2015/03315; B60K 2015/03296; B60K 15/03006
See application file for complete search history.

(56) References Cited

U.S. PATENT DOCUMENTS

| | | | | |
|---|---|---|---|---|
| 5,092,281 | A * | 3/1992 | Iwaki | B66F 9/07572 123/3 |
| 5,375,580 | A | 12/1994 | Stolz et al. | |
| 5,868,122 | A | 2/1999 | Gram et al. | |

(Continued)

FOREIGN PATENT DOCUMENTS

| | | | |
|---|---|---|---|
| CN | 106915235 | A | 7/2017 |
| CN | 107687379 | A | 2/2018 |

(Continued)

OTHER PUBLICATIONS

Certification of Correction for U.S. Pat. No. 5,092,281, dated Mar. 3, 1992.

(Continued)

*Primary Examiner* — Kevin A Lathers
(74) *Attorney, Agent, or Firm* — Withrow & Terranova, PLLC

(57) ABSTRACT

A gaseous fuel storage arrangement for a combustion engine or fuel cell of a vehicle having an exhaust gas system, the gaseous fuel storage arrangement comprising: a storage housing and a gaseous fuel tank; an exhaust gas transportation line extending from the exhaust gas system to the storage housing; a controllable valve configurable in an open position for enabling supply of exhaust gas to the storage housing via the exhaust gas transportation line; and a control unit configured to determine an exhaust gas temperature in the exhaust gas system, and to determine a storage gas temperature in the storage housing, and in response to the determined storage gas temperature being below a first predefined temperature threshold and below the determined exhaust gas temperature, control the controllable valve in the open position.

21 Claims, 2 Drawing Sheets

(56) References Cited

U.S. PATENT DOCUMENTS

| | | | | |
|---|---|---|---|---|
| 7,367,312 | B1 | 5/2008 | Boyer et al. | |
| 9,995,258 | B2 | 6/2018 | Takeuchi et al. | |
| 11,639,691 | B2 | 5/2023 | Puran et al. | |
| 2004/0200461 | A1* | 10/2004 | Chu | F02M 21/0236 123/557 |
| 2008/0099002 | A1 | 5/2008 | Boyer et al. | |
| 2009/0114367 | A1 | 5/2009 | Handa | |
| 2014/0116375 | A1 | 5/2014 | Kim et al. | |
| 2014/0209070 | A1 | 7/2014 | Gleeson et al. | |
| 2021/0131382 | A1 | 5/2021 | Manfrida et al. | |
| 2021/0301775 | A1 | 9/2021 | Puran et al. | |
| 2021/0372350 | A1 | 12/2021 | Seba et al. | |
| 2022/0260040 | A1 | 8/2022 | Malischewski et al. | |
| 2025/0297587 | A1 | 9/2025 | Matsuda | |
| 2026/0028949 | A1* | 1/2026 | Wall, II | C01B 3/047 |

FOREIGN PATENT DOCUMENTS

| | | | | |
|---|---|---|---|---|
| CN | 111336047 | A | 6/2020 | |
| CN | 114183276 | A | 3/2022 | |
| CN | 116344866 | A | 6/2023 | |
| DE | 102010053498 | A1 | 6/2012 | |
| DE | 102016220851 | A1 | 4/2018 | |
| DE | 102018215847 | A1 | 3/2020 | |
| DE | 102021131038 | A1 | 6/2023 | |
| EP | 3168445 | A1 | 5/2017 | |
| EP | 3578793 | A1 * | 12/2019 | F02N 19/04 |
| EP | 3578793 | B1 | 12/2019 | |
| EP | 3578794 | A1 * | 12/2019 | F17D 1/082 |
| EP | 3885640 | A2 | 9/2021 | |
| EP | 3915820 | A1 | 12/2021 | |
| EP | 3885640 | A3 | 1/2022 | |
| EP | 4245975 | A1 | 9/2023 | |
| JP | 2017166424 | A | 9/2017 | |
| JP | 2020094526 | A | 6/2020 | |
| KR | 20190090679 | A | 8/2019 | |
| KR | 20200042278 | A | 4/2020 | |
| KR | 102213227 | B1 | 2/2021 | |
| KR | 20220051100 | A | 4/2022 | |
| WO | 2016115603 | A1 | 7/2016 | |
| WO | 2022266769 | A1 | 12/2022 | |

OTHER PUBLICATIONS

Extended European Search Report for European Patent Application No. 23216341.0, mailed May 21, 2024, 5 pages.
Extended European Search Report for European Patent Application No. 23216339.4, mailed May 21, 2024, 7 pages.
Extended European Search Report for European Patent Application No. 23216338.6, mailed May 2, 2024, 6 pages.
Extended European Search Report for European Patent Application No. 23216343.6, mailed May 21, 2024, 7 pages.

* cited by examiner

GASEOUS FUEL STORAGE ARRANGEMENT

PRIORITY APPLICATIONS

The present application claims priority to European Patent Application No. 23216338.6, filed on Dec. 13, 2023, and entitled "GASEOUS FUEL STORAGE ARRANGEMENT," which is incorporated herein by reference in its entirety.

TECHNICAL FIELD

The disclosure relates generally to gaseous fuel storage arrangement. In particular aspects, the disclosure relates to gaseous fuel storage arrangements for a combustion engine or a fuel cell of a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that are important aspects when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is natural that also the costs of engine components are reduced.

In order to meet the demands, various engine concepts have been developed throughout the years where conventional combustion cylinders have been combined with e.g. a pre-compression stage and/or an expansion stage. Other engine concepts relates to the fuel used and combusted in the combustion engine. For example, gasoline and diesel can be exchanged to more environmentally friendly fuels, e.g. biofuels such as e.g. ethanol. In some cases, when exchanging the fuel, the combustion engine needs to be adapted to optimally operate on the new fuel. Lately, clean combustion engines, such as e.g. near zero emission combustion engines have become increasingly interesting. For example, by changing the fuel to hydrogen, or a hydrogen based fuel, the combustion of hydrogen with oxygen produces only water as biproduct (theoretically). Moreover, fuel cells in combination with an electric machine, such as an electric traction machine, provides for a clean engine concept.

The combustion engine and/or fuel cell typically require an efficient and reliable fuel supply, and a pressure and temperature regulation of the supplied gaseous fuel. However, the systems today may not provide optimal temperature regulation of the stored gaseous fuel and/or of the supplied gaseous fuel, leading to inefficiencies in fuel consumption and potential damage to the engine components. There is thus a need in the industry for an improved system.

SUMMARY

According to a first aspect of the disclosure, a gaseous fuel storage arrangement for a combustion engine or fuel cell of a vehicle having an exhaust gas system is provided.

The gaseous fuel storage arrangement comprises: a storage housing and a gaseous fuel tank arranged inside the storage housing; an exhaust gas transportation line extending from the exhaust gas system to the storage housing; a controllable valve arranged in the exhaust gas transportation line, the controllable valve being configurable in an open position for enabling supply of exhaust gas to the storage housing via the exhaust gas transportation line, and in a closed position for preventing supply of exhaust gas to the storage housing via the exhaust gas transportation line; and a control unit configured to determine an exhaust gas temperature in the exhaust gas system, and to determine a storage gas temperature in the storage housing, and in response to the determined storage gas temperature being below a first predefined temperature threshold and below the determined exhaust gas temperature, control the controllable valve in the open position. The first aspect of the disclosure may seek to solve problems with energy inefficient gaseous fuel storage arrangements. A technical benefit may include an improved heating of the gaseous fuel storage arrangement. That is, by utilizing the heat from the exhaust gas from the combustion engine or fuel cell, the storage housing and/or the gaseous fuel tank arranged inside the storage housing may be heated. Thus, the supply of exhaust gas from the exhaust gas system to the storage housing provides for an energy efficient heating of the storage housing and/or the gaseous fuel tank arranged inside the storage housing. Moreover, by the control unit being configured to control the controllable valve in closed and open positions, the supply of exhaust gas to the storage housing via the exhaust gas transportation line is adapted based on the heating need of the storage housing and/or the gaseous fuel tank arranged inside the storage housing, providing an energy efficient heating of the gaseous fuel storage arrangement. It should be understood that the exhaust gas system is arranged downstream of the combustion engine or fuel cell, and is e.g. arranged to clean or otherwise handle the exhaust gases from the combustion engine or fuel cell. For example, exhaust gas system comprises an emission reducing component for cleaning the exhaust gas, such as a catalyst for catalytic reduction or oxidation of emissions or a particulate filter.

Optionally in some examples, including in at least one preferred example, the control unit is further configured to, in response to the determined storage gas temperature being above a second predefined temperature threshold, control the controllable valve in the closed position. A technical benefit may include prevention of harmful heating of the storage housing and/or the gaseous fuel tank arranged inside the storage housing. That is, if the determined temperature of the exhaust gas in the exhaust gas system is deemed to be too high, i.e. high enough to be harmful to the storage housing and/or the gaseous fuel tank arranged inside the storage housing, the control unit is configured to control the controllable valve in the closed position, and hence preventing flow of exhaust gas in the exhaust gas transportation line to the storage housing. Thus, the second predefined temperature threshold is typically higher than the first predefined temperature threshold. The first predefined temperature threshold may e.g. be set as a deemed temperature in which the storage housing and/or the gaseous fuel tank arranged inside the storage housing is to be heated. The second predefined temperature threshold may e.g. be set as a deemed temperature in which the storage housing and/or the gaseous fuel tank arranged inside the storage housing is not to be heated.

It should be noted that the controllable valve may be simple on/off valve (i.e. is moved in one step from a fully open position to a fully closed position), or a control valve which opens and closes gradually. Thus, the previously mentioned open position of the controllable valve may be a fully open position or a partly open position, as long as a supply of exhaust gas to the storage housing via the exhaust gas transportation line is enabled.

Optionally in some examples, including in at least one preferred example, in which the controllable valve is a control valve configured to open and close gradually (i.e. having a variable degree of opening), wherein the control unit is configured to adapt the degree of opening of the control valve in response to the temperature difference between the determined storage gas temperature and the determine an exhaust gas temperature. A technical benefit may include improved adaptation of the heating of the storage housing and/or the gaseous fuel tank arranged inside the storage housing. Hereby, the degree of opening of the control valve may be set in response to how close the determined storage gas temperature is to the first predefined temperature threshold and/or the second predefined temperature threshold. For example, in response to that the determined storage gas temperature is below the second predetermined temperature threshold, but within a first predefined range of the second predetermined temperature threshold, the control unit may control the control valve to gradually close (i.e. from being fully open) to thereby reduce supply of exhaust gas to the storage housing via the exhaust gas transportation line. Moreover, the control unit may be configured to initiate closing of the control valve in response to that the determined storage gas temperature reaches the first predefined range, and to further gradually close the control valve as the determined storage gas temperature increases within the first predefined range, and optionally to gradually open the control valve as the determined storage gas temperature decreases within the first predefined range. For example, the control unit may be configured to gradually close the control valve as the determined storage gas temperature increases within the first predefined range such that the control valve is fully closed as the determined storage gas temperature reaches the second predefined temperature threshold. The first predefined range may e.g. extend from the second predefined temperature threshold to a value being 15%-25% below the second predefined temperature threshold (e.g. determined as percentage with regards to degrees Celsius).

Optionally in some examples, including in at least one preferred example, the control unit is configured to control the controllable valve to be in an open position in response to that the determined storage gas temperature is between the first predefined temperature threshold and the second predefined temperature threshold. For example, when the controllable valve is a control valve, the control unit may be configured to adapt the degree of opening of the control valve as previously described.

Optionally in some examples, including in at least one preferred example, the gaseous fuel storage arrangement further comprises a venting line arranged in the storage housing for venting the storage housing. A technical benefit may include improved control of the temperature in the storage housing. Thus, gas within the storage housing, such as gas between inner walls of the storage housing and the outer wall of the gaseous fuel tank, can be vented out of the storage housing. The venting line may e.g. be an opening in the storage housing (e.g. an opening providing continuous venting of the storage housing). The venting line may extend from an inside of the storage housing to an outside of the storage housing. The venting line may be arranged to vent the storage housing to the atmosphere.

Optionally in some examples, including in at least one preferred example, the gaseous fuel storage arrangement further comprises a venting valve arranged in the venting line and being configurable in an open position for enabling venting of the storage housing to the venting line, and in a closed position for preventing venting of the storage housing to the venting line. A technical benefit may include improved control of the temperature in the storage housing. Thus, gas within the storage housing, such as gas between inner walls of the storage housing and the outer wall of the gaseous fuel tank, can be vented out of the storage housing in a controllable manner. For example, the control unit may be configured to control the venting valve in the closed position in response to a demand for quicker heating of the storage housing and/or the gaseous fuel tank arranged inside the storage housing (typically when the controllable valve is in an open position).

Optionally in some examples, including in at least one preferred example, the control unit is configured to, in response to the determined storage gas temperature being above the second predefined temperature threshold, control the venting valve in the open or closed position. A technical benefit may include improved control of the temperature in the storage housing. For example, the control unit may be configured to control the venting valve in the open position in response to the determined storage gas temperature being above the second predefined temperature threshold, and further in response to that the controllable valve is closed. Hereby, a quicker venting of the storage housing may be achieved. However, if there is a risk that the increased gas flow within the storage housing due to an open venting valve could further heat the gaseous fuel tank, the control unit may be configured to control the venting valve in the closed position in response to the determined storage gas temperature being above the second predefined temperature threshold. For example, the control unit may be configured to control the venting valve in the open or closed position in response to a resulting temperature change of opening or closing the venting valve. Thus, in case closing the venting valve results in an undesired raise in storage gas temperature, the control unit may be configured to open the valve, and vice versa. This may e.g. be achieved by controlling the venting valve by means of a PID controller.

It should be noted that the venting valve may be simple on/off valve (i.e. is moved in one step from a fully open position to a fully closed position), or a control valve which opens and closes gradually. Thus, the previously mentioned open position of the venting valve may be a fully open position or a partly open position.

Optionally in some examples, including in at least one preferred example, in which the exhaust gas system comprises an emission reducing component for cleaning the exhaust gas, an inlet of the exhaust gas transportation line is arranged in the exhaust gas system upstream or downstream of the emission reducing component. A technical benefit may include a versatile utilization of the exhaust gas to heat the storage housing and/or the gaseous fuel tank arranged in the storage housing. For example, in examples in which the exhaust gas transportation line is arranged in the exhaust gas system upstream of the emission reducing component, the exhaust gas may be utilized at a high temperature. However, in examples in which the exhaust gas transportation line is arranged in the exhaust gas system downstream of the emission reducing component, the exhaust gas may be utilized with a higher cleanliness.

Optionally in some examples, including in at least one preferred example, the gaseous fuel storage arrangement further comprises a separation wall arranged in the storage housing for dividing the storage housing into a first storage compartment and a second storage compartment, wherein an outlet of the exhaust gas transportation line is arranged in the second storage compartment. A technical benefit may include improved control of the heating of the storage housing. The separation wall may e.g. be arranged to sealingly separate the first and second storage compartments. That is, gas within the storage housing, except of the gaseous fuel within the gaseous fuel tank, cannot flow between the first and second storage compartments. The previously mentioned venting line and optional venting valve, is preferably arranged in the second storage compartment. However, according to some examples, the separation wall comprises a opening, such as a venting opening which may or may not comprise a closable valve controllable by the control unit, between the first and second storage compartments.

Optionally in some examples, including in at least one preferred example, the gaseous fuel tank is arranged in the first storage compartment, and the second storage compartment is arranged as a thermal buffer wherein the separation wall is arranged to transfer heat between second storage compartment and the first storage compartment. A technical benefit may include improved utilization of the heat from the exhaust gas and/or improved control of the heating of the storage housing, such as the heating of the first storage compartment and/or the gaseous fuel tank arranged in the first storage compartment. For example, the second storage compartment may be heated to above the second predefined temperature threshold, and the control unit may thus be configured to, in response to the determined storage gas temperature (e.g. that of the first storage compartment or of the gaseous fuel tank arranged in the first storage compartment) being above the second predefined temperature threshold, control the controllable valve in the open position. The heating of the first storage compartment or of the gaseous fuel tank arranged in the first storage compartment may then be controlled by heat conduction through the separation wall, e.g. by the delay for which the separation wall is heated, heat conduction through the separation wall and heat convection to the first storage compartment. Hereby, more heat of the exhaust gases may be utilized, and/or the heating of the first storage compartment or of the gaseous fuel tank arranged in the first storage compartment may be better controlled. Optionally, the second storage compartment is free of any gaseous fuel tanks. Optionally, a majority of the separation wall is made of steel, or of a material comprising at least 50% iron (Fe). Optionally, a majority of the storage housing walls enclosing the second storage compartment is made of a material comprising at least 50% iron.

Optionally in some examples, including in at least one preferred example, the gaseous fuel tank is arranged in the second storage compartment. A technical benefit may include improved heating of the gaseous fuel tank and/or of the gaseous fuel in the gaseous fuel tank. For example, the gaseous fuel tank may be a buffer tank arranged in between a storage tank and the combustion engine or fuel cell. In some examples, the gaseous fuel storage arrangement comprises at least two gaseous fuel tanks, a first gaseous fuel tank arranged in the first storage compartment and a second gaseous fuel tank arranged in the second storage compartment. The first and second gaseous fuel tanks may be fluidly connected to each other, possibly via a compressor. Thus, the first gaseous fuel tank may be a storage tank for storing pressurized gaseous fuel and the second gaseous fuel tank may be a buffer tank for temporarily storing pressurized gaseous fuel downstream of the first gaseous fuel tank, and downstream of the optional compressor. The buffer tank may be made of steel, or a material comprising at least 50% iron (Fe), while the storage tank may be made of carbon fiber, or carbon fiber composite. Thus, heating of the buffer tank using the exhaust gas may be preferred over heating the storage tank, as the material of the buffer tank can withstand higher temperatures as compared to the storage tank.

Optionally in some examples, including in at least one preferred example, the gaseous fuel storage arrangement further comprises a gaseous fuel supply line for supplying gaseous fuel to the combustion engine or fuel cell, wherein the gaseous fuel supply line at least partly extends through the second storage compartment. A technical benefit may include improved and/or efficient heating of the gaseous fuel. Thus, as an alternative to, or in addition to, the previously mentioned buffer tank, the gaseous fuel supply line may extend at least partly through the second storage compartment for heating the gaseous fuel in the gaseous fuel supply line.

Optionally in some examples, including in at least one preferred example, the gaseous fuel storage arrangement further comprising a first temperature sensor arranged in the exhaust gas system, and a second temperature sensor arranged in the storage housing between a storage housing wall of the storage housing and the gaseous fuel tank or inside the gaseous fuel tank, wherein the first and second temperature sensors are configured to transmit temperature data to the control unit. A technical benefit may include efficient determination of the storage gas temperature and the exhaust gas temperature. The second temperature sensor may e.g. be arranged in the exhaust gas system adjacent an inlet to the exhaust gas transportation line (e.g. just upstream, or just downstream, of an inlet to the exhaust gas transportation line). The control unit may be configured to receive temperature data from the first temperature sensor and to determine the storage gas temperature from the temperature data. Moreover, the control unit may be configured to receive temperature data from the second temperature sensor and to determine the exhaust gas temperature from the temperature data.

It should be understood that the storage gas temperature is either that of the gas (e.g. air) in the storage housing between the storage housing walls of the storage housing (i.e. the inner walls) and the gaseous fuel tank, or the temperature of the gaseous fuel in the gaseous fuel tank. Thus, as previously described, in case the storage gas temperature is determined by the first temperature sensor, the first temperature sensor is either arrange in the space between the storage housing walls of the storage housing and the gaseous fuel tank, or within the gaseous fuel tank.

Optionally in some examples, including in at least one preferred example, the exhaust gas transportation line includes a filter for removing particulates from the exhaust gas before it enters the storage housing. A technical benefit may include utilization of cleaner exhaust gas in the storage housing.

Optionally in some examples, including in at least one preferred example, the exhaust gas transportation line is insulated to minimize heat loss during transportation of exhaust gas to the storage housing. A technical benefit may include improved energy efficiency of the heating of the storage housing and/or of the gaseous fuel tank arranged in the storage housing.

Optionally in some examples, including in at least one preferred example, a majority of the gaseous fuel tank is made of carbon fiber or a carbon fiber composite. A technical benefit may include efficient storage of the gaseous fuel.

Optionally in some examples, including in at least one preferred example, the gaseous fuel tank stores pressurized hydrogen. A technical benefit may include utilization of a fuel having a high energy density (approximately 120 MJ/kg). Moreover, by using hydrogen as the fuel for combustion in the clean combustion engine, CO2, unburned hydrocarbons (CO) and other carbon-containing emissions can be kept low, or even be avoided.

Optionally in some examples, including in at least one preferred example, the gaseous fuel tank may be arranged to store the pressurized gaseous fuel at 700 bar or 800 bar. For example, the gaseous fuel tank is arranged to keep the pressurized gaseous fuel at a maximum pressure of between 700 bar and 800 bar. For example, the gaseous fuel tank is arranged to store the pressurized gaseous fuel between 70 bar and 700 bar or 800 bar.

Optionally in some examples, including in at least one preferred example, the fuel stored in the gaseous fuel tank is mainly gaseous. For example, at least 70%, or at least 80%, or at least 90%, or at least 95% (based on volume) of the fuel in the gaseous fuel tank is gaseous. Thus, the gaseous fuel tank is arranged to store the fuel as pressurized gaseous fuel such that at least 70%, or at least 80%, or at least 90%, or at least 95% (based on volume) of the fuel in the gaseous fuel tank is gaseous.

Optionally in some examples, including in at least one preferred example, the combustion engine is a clean combustion engine, such as a hydrogen combustion engine, or a hydrogen high pressure direct injection engine, wherein the gaseous fuel storage arrangement is arranged to supply pressurized gaseous fuel to such clean combustion engine. The clean combustion engine may be configured to receive gaseous fuel at a changeable demanded injection pressure being above a predetermined minimum required injection pressure and below a predetermined maximum required injection pressure. The control unit may e.g. be configured to control the pressure of the gaseous fuel supplied to a fuel rail, e.g. by means of an engine injection pressure regulator arranged upstream of or on the fuel rail. Optionally in some examples, including in at least one preferred example, the minimum required injection pressure of the clean combustion engine is at least 80 bar.

According to a second aspect of the disclosure, a engine system for a vehicle is provided. The engine system comprising: the gaseous fuel storage arrangement of the first aspect of the disclosure; a combustion engine or fuel cell for providing propulsion power of the vehicle; an exhaust gas system arranged downstream of the combustion engine or fuel cell, the exhaust gas system being arranged to transport exhaust gas to the atmosphere. The second aspect of the disclosure may seek to solve the same problem as described for the first aspect of the disclosure. Thus, effects and features of the second aspect of the disclosure are largely analogous to those described above in connection with the first aspect of the disclosure Optionally in some examples, including in at least one preferred example, the exhaust gas system comprises: an exhaust gas line comprising an upstream portion for receiving exhaust gas from the combustion engine or fuel cell, a downstream portion for discharging the exhaust gas to the atmosphere, wherein an inlet of the exhaust gas transportation line is arranged in an intermediate portion arranged between the upstream and downstream portions of the exhaust gas line; a backpressure valve arranged in a downstream portion of the exhaust gas line; wherein the control unit is configured to control the backpressure valve to adjust the gas pressure at the inlet of the exhaust gas transportation line. A technical benefit may include an efficient way to control the gas pressure at the inlet of the exhaust gas transportation line. Hereby, the temperature, and/or the flow, of exhaust gas in the exhaust gas transportation line may be further controlled.

Optionally in some examples, including in at least one preferred example, the exhaust gas system comprises an emission reducing component for cleaning the exhaust gas, wherein an inlet of the exhaust gas transportation line is arranged in the exhaust gas system upstream of the emission reducing component. A technical benefit may include utilization of exhaust gas at a higher temperature as compared to downstream of the emission reducing component.

Optionally in some examples, including in at least one preferred example, the exhaust gas system comprises an emission reducing component for cleaning the exhaust gas, and wherein an inlet of the exhaust gas transportation line is arranged in the exhaust gas system downstream of the emission reducing component. A technical benefit may include utilization of exhaust gas at a higher cleanliness as compared to upstream of the emission reducing component.

Optionally in some examples, including in at least one preferred example, the combustion engine is a clean combustion engine such as a hydrogen combustion engine. The clean combustion engine may be configured to combust the gaseous fuel, e.g. hydrogen or a hydrogen-based fuel, producing water as by-product in the exhausts, wherein the gaseous fuel storage arrangement is arranged to supply such gaseous fuel to the clean combustion engine. The clean combustion engine is typically configured to compress the gaseous fuel, e.g. hydrogen or a hydrogen-based fuel, together with air whereafter the fuel-air mixture is ignited (by a spark-plug or injection of another fuel, e.g. diesel). Alternatively, the clean combustion engine may be configured to compress only air, wherein the gaseous fuel is injected at the end of the compression stroke of the engine to either auto-ignite (by compression ignition) or be ignited by a spark-plug or injection of another fuel (e.g. diesel). The clean combustion engine may thus be an internal combustion engine.

Optionally in some examples, including in at least one preferred example, the combustion engine is a hydrogen high pressure direct injection engine.

According to third aspect of the disclosure, a vehicle comprising the gaseous fuel storage arrangement according to the first aspect of the disclosure, or the engine system of the second aspect of the disclosure is provided. The third aspect of the disclosure may seek to solve the same problem as described for the first and second aspects of the disclosure. Thus, effects and features of the third aspect of the disclosure are largely analogous to those described above in connection with the first and second aspects of the disclosure.

It should be understood that the gaseous fuel of the gaseous fuel storage arrangement may be hydrogen or a hydrogen-based fuel. As an alternative, the gaseous fuel of the gaseous fuel storage arrangement is at least one of the following: natural gas, biogas, syngas, methane, propane and butane.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

DETAILED DESCRIPTION

The detailed description set forth below provides information and examples of the disclosed technology with sufficient detail to enable those skilled in the art to practice the disclosure.

The disclosed technology may solve the problem relating to energy inefficient gaseous fuel storage arrangements. The disclosed technology uses the heat from the exhaust gas from the combustion engine or fuel cell to heat the storage housing and/or the gaseous fuel tank(s) arranged inside the storage housing. A technical benefit may include an improved heating of the gaseous fuel storage arrangement. Thus, the supply of exhaust gas from the exhaust gas system to the storage housing provides for an energy efficient heating of the storage housing and/or the gaseous fuel tank arranged inside the storage housing. By using a control unit configured to control the controllable valve in closed and open positions, the supply of exhaust gas to the storage housing via the exhaust gas transportation line may be adapted based on the heating need of the storage housing and/or the gaseous fuel tank(s) arranged inside the storage housing. Hereby, an energy efficient heating of the gaseous fuel storage arrangement is achieved.

Figure 1:
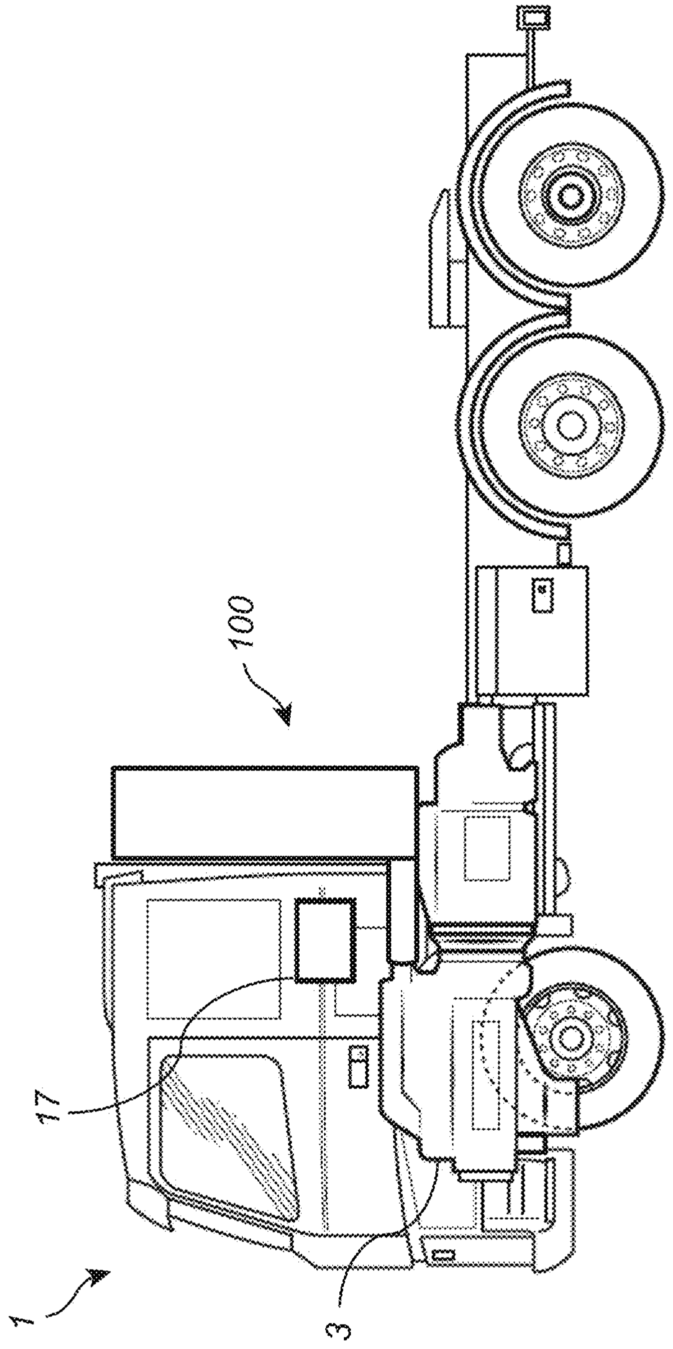
FIG. 1 is an exemplary, partly schematic, side view of vehicle comprising a traction motor and a gaseous fuel storage arrangement according to one example.

FIG. 1 shows a vehicle 1 in the form of an exemplary heavy duty truck. The vehicle 1 illustrated in FIG. 1 comprises traction motor 3 for propelling the vehicle 1, the traction motor 3 being either an internal combustion engine (shown in FIG. 2) or an electric machine. In case the traction motor 3 is an electric machine, the vehicle may further comprise a fuel cell (shown in FIG. 2) for powering the electric machine. The internal combustion engine or fuel cell is configured to utilize gaseous fuel and produce propulsion power or electricity. However, the vehicle may be a hybrid, comprising at least one electric machine or electric traction machine powered by the fuel cell, and an internal combustion engine to provide additional propulsion power to the vehicle 1. The gaseous fuel (e.g. hydrogen) for the internal combustion engine or fuel cell may be stored in a gaseous fuel storage arrangement 100. The combustion engine may be a clean combustion engine, e.g. a hydrogen combustion engine, such as a hydrogen high pressure direct injection engine.

The vehicle 1 comprises a control unit 17 configured to control at least some of the operation of the gaseous fuel storage arrangement 100, such as e.g. the control of the heating of the gaseous fuel storage arrangement 100.

Figure 2:
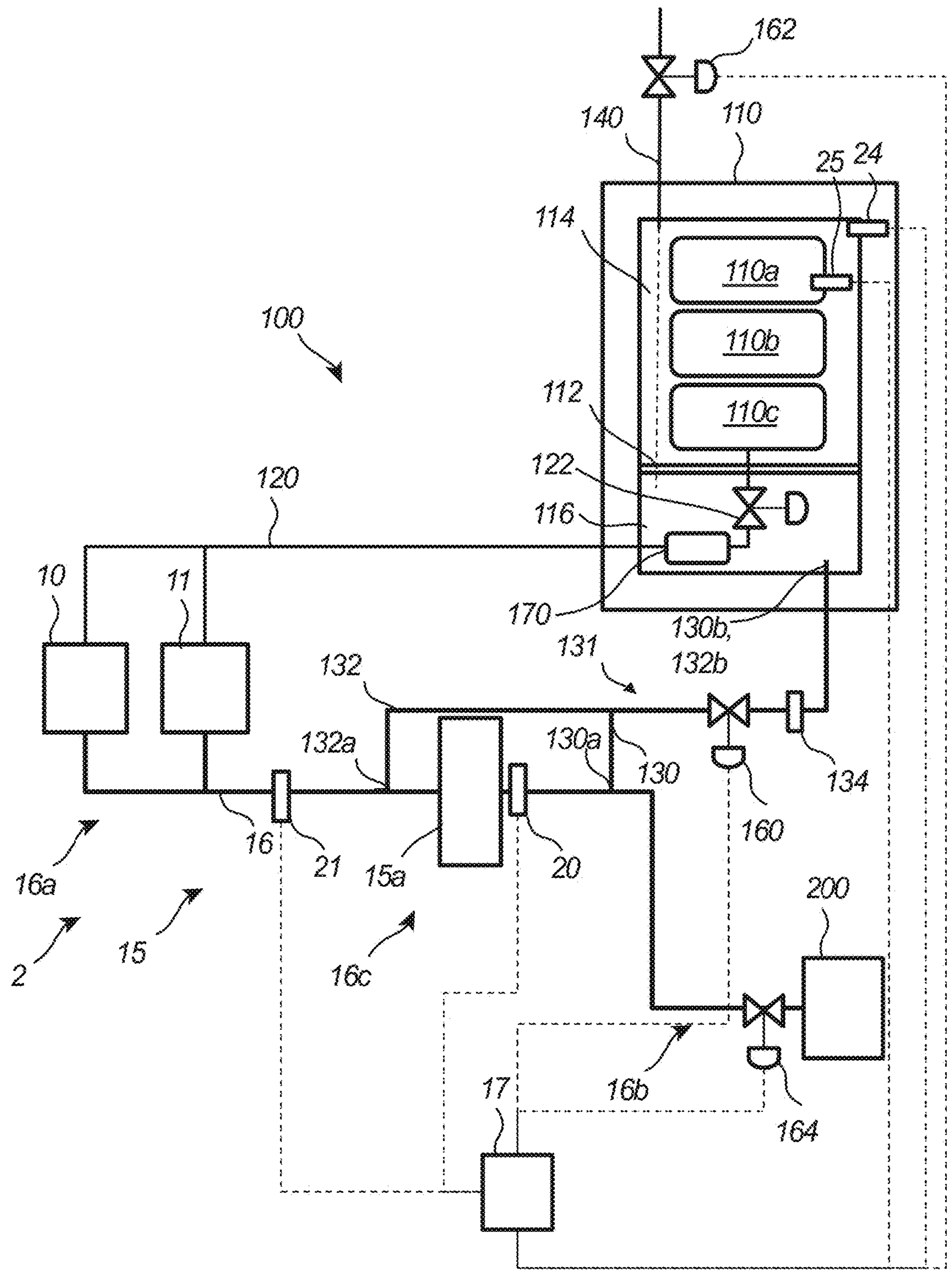
FIG. 2 is a schematic view of a gaseous fuel storage arrangement, a combustion engine, a fuel cell and an exhaust gas system for the combustion engine and/or the fuel cell according to one example.

In FIG. 2, the gaseous fuel storage arrangement 100 of FIG. 1 is shown in more detail. The gaseous fuel storage arrangement 100 comprises storage housing 110 and at least one gaseous fuel tank 110*a*, 110*b*, 110*c* arranged inside the storage housing 110. Here, the at least one gaseous fuel tank 110*a*, 110*b*, 110*c* is exemplified as three gaseous fuel tanks, i.e. a first gaseous fuel tank 110*a*, a second gaseous fuel tank 110*b* and a third gaseous fuel tank 110*c*. The at least one gaseous fuel tank 110*a*, 110*b*, 110*c* is storing, or is arranged to store, gaseous fuel, e.g. pressurized gaseous fuel (e.g. hydrogen). For example, a majority of each one of the gaseous fuel tanks 110*a*, 110*b*, 110*c* is made of carbon fiber or a carbon fiber composite.

The gaseous fuel storage arrangement 100 may optionally comprises a supply line 120 arranged to supply pressurized gaseous fuel from the gaseous fuel tank 110*a*, 110*b*, 110*c* to a combustion engine 10 and/or fuel cell 11. Any one or all of the first, second and third gaseous fuel tanks 110*a*, 110*b*, 110*c* may be fluidly coupled to a controllable supply valve 122 arranged in the supply line 120 and configured to control the flow of gaseous fuel in the supply line 120. Thus, the gaseous fuel storage arrangement 100 may additionally provide gaseous fuel supply functionality to the combustion engine 10 and/or fuel cell 11, and may thus be referred to as a gaseous fuel supply system or a combined gaseous fuel storage and supply system. It should be noted that only one of the combustion engine 10 and fuel cell 11 may be present, i.e. that the gaseous fuel storage arrangement 100 is associated with only one of the combustion engine 10 and fuel cell 11. As described with reference to FIG. 1, the fuel cell 11 is typically configured to produce electricity for propulsion power of an electric machine.

As shown in FIG. 2, the combustion engine 10 and/or the fuel cell 11 is associated with an exhaust gas system 15. The exhaust gas system 15 is arranged downstream of the combustion engine 10 and/or fuel cell 11 and comprising an exhaust gas line 16 arranged to transport exhaust gas from the combustion engine 10 and/or fuel cell 11 to the atmosphere 200. Thus, the exhaust gas line 16 comprises an upstream portion 16*a* for receiving exhaust gas from the combustion engine 10 or fuel cell 11, a downstream portion 16*b* for discharging the exhaust gas to the atmosphere 200, and an intermediate portion 16*c* arranged in between the upstream and downstream portions 16*a*, 16*b*. The exhaust gas system 15 may comprise an emission reducing component 15*a* for cleaning the exhaust gas, typically arranged in the intermediate portion 16*c* of the exhaust gas line 16. Thus, the exhaust gas system 15 may be an exhaust after treatment system, EATS.

Moreover, the gaseous fuel storage arrangement 100 comprises an exhaust gas transportation line 130, 132 extending from the exhaust gas system 15 to the storage housing 110. As shown in the example of FIG. 2, the gaseous fuel storage arrangement 100 comprises a first exhaust gas transportation line 130 extending from the exhaust gas system 15 downstream of the emission reducing component 15*a* to the storage housing 110. In more detail, an inlet 130*a* of the first exhaust gas transportation line 130 is arranged in the intermediate portion 16*c* of the exhaust gas line 16 downstream of the emission reducing component 15*a*, and an outlet 130*b* of the first exhaust gas transportation line 130 is arranged inside of the storage housing 110. The first exhaust transportation line 130 is arranged to supply exhaust gas from the exhaust gas system 15 and the exhaust gas line 16 to the storage housing 110 for heating the storage housing 110 and/or components in the storage housing, such as the first, second and third gaseous fuel tanks 110*a*, 110*b*, 110*c*.

The gaseous fuel storage arrangement 100 comprises a controllable valve 160 arranged in the first exhaust gas transportation line 130. The controllable valve 160 is configurable in an open position for enabling supply of exhaust gas to the storage housing 110 via the first exhaust gas transportation line 130 and in a closed position for preventing supply of exhaust gas to the storage housing 110 via the first exhaust gas transportation line 130.

Moreover, as also shown in the example of FIG. 2, the gaseous fuel storage arrangement 100 may comprises a second exhaust gas transportation line 132 extending from the exhaust gas system 15 upstream of the emission reducing component 15*a* to the storage housing 110. In more detail, an inlet 132*a* of the second exhaust gas transportation line 132 is arranged in the exhaust gas line 16 upstream of the emission reducing component 15*a*, and an outlet 132*a* of the second exhaust gas transportation line 132 is arranged inside of the storage housing 110. The second exhaust transportation line 132 is arranged to supply exhaust gas from the exhaust gas system 15 and the exhaust gas line 16 to the storage housing 110 for heating the storage housing 110 and/or components in the storage housing, such as the first, second and third gaseous fuel tanks 110*a*, 110*b*, 110*c*.

In FIG. 2, the first and second exhaust transportation lines 130, 132 comprises an overlapping portion 131, in which e.g. the first and second exhaust transportation lines 130, 132 are routed in the same piping. In the example of FIG. 2, the overlapping portion 131 is arranged in the second half of the first and second exhaust transportation lines 130, 132 closest to the outlets 130*b*, 132*b*. The previously mentioned controllable valve 160 is arranged in the overlapping portion 131 and may thus control the supply of exhaust gas to the storage housing 110 from both the first and second exhaust transportation lines 130, 132. However, it should be mentioned that only one of the first and second exhaust transportation lines 130, 132 may be present in the gaseous fuel storage arrangement 100. In case only the second exhaust transportation line 132 is present, the controllable valve 160 is arranged in the second exhaust transportation line 132. Thus, in the following the supply of exhaust gas to the storage housing 110 via the controllable valve 160 will be described with reference to the first and/or second exhaust transportation line 130, 132. The gaseous fuel storage arrangement 100 may further comprise a filter 134 for removing particulates from the exhaust gas before it enters the storage housing 110. The filter 134 is arranged in the first and/or second exhaust transportation line 130, 132, e.g. in the overlapping portion 131.

The gaseous fuel storage arrangement 100 comprises a control unit 17, as mentioned with reference to FIG. 1. The control unit 17 is configured to determine an exhaust gas temperature in the exhaust gas system 15, and to determine a storage gas temperature in the storage housing 110, and in response to the determined storage gas temperature being below a first predefined temperature threshold and below the determined exhaust gas temperature, control the controllable valve 160 in the open position. Hereby, the first and/or second exhaust transportation line 130, 132 may supply exhaust gas from the exhaust gas line 16 to the storage housing 110 for heating the storage housing 110 and/or components in the storage housing. The control unit 17 may be further configured to, in response to the determined storage gas temperature being above a second predefined temperature threshold, control the controllable valve 160 in the closed position. Hereby, harmful heating of the storage housing 110 and/or components arranged inside the storage housing 110 may be prevented. Thus, the control unit 17 may control the controllable valve 160 for adequate heating of the storage housing 110 or components in the storage housing 110 by adapting the supply of exhaust gas in the first and/or second exhaust gas transportation lines 130, 132.

The exhaust gas temperature is the temperature of the exhaust gas in the exhaust gas line 16. For example, the gaseous fuel storage arrangement 100 may comprise first temperature sensors 20, 21 arranged to determine the exhaust gas temperature. In FIG. 2, a first one 20 of the first temperature sensors 20, 21 is arranged in the exhaust gas line 16 upstream of the inlet 130*a* of the first exhaust gas transportation line 130, and downstream of the emission reducing component 15*a*. Hereby, the temperature of the exhaust gas entering into the first exhaust gas transportation line 130 may be determined. As also shown in FIG. 2, a second one 21 of the first temperature sensors 20, 21 is arranged in the exhaust gas line 16 upstream of the inlet 132*a* of the second exhaust gas transportation line 132, and upstream of the emission reducing component 15*a*. Hereby, the temperature of the exhaust gas entering into the second exhaust gas transportation line 132 may be determined. Correspondingly to the first and second exhaust gas transportation lines 130, 132, only one of the first temperature sensors 20, 21 may be present in the gaseous fuel storage arrangement 100.

The storage gas temperature may be either that of the gas (e.g. air) in the storage housing 110 between the storage housing walls of the storage housing 110 and the gaseous fuel tanks 110*a*, 110*b*, 110*c*, or the temperature of the gaseous fuel in one of the gaseous fuel tanks 110*a*, 110*b*, 110*c*. For example, the gaseous fuel storage arrangement 100 may comprise second temperature sensors 24, 25 arranged to determine the storage gas temperature. In FIG. 2, a first one 24 of the first temperature sensors 24, 25 is arranged in the space between the storage housing walls of the storage housing 110 and the gaseous fuel tanks 110*a*, 110*b*, 110*c*. Hereby, the temperature of the gas (or air) in the storage housing surrounding the first, second and third gaseous fuel tanks 110*a*, 110*b*, 110*c* may be determined as the storage gas temperature. As also shown in FIG. 2, a second one 25 of the second temperature sensors 24, 25 is arranged in the first gaseous fuel tank 110*a*. Hereby, the temperature of the gaseous fuel in the first gaseous fuel tank 110*a* may be determined as the storage gas temperature. It should be mentioned that only one of the second temperature sensors 24, 25 may be present in the gaseous fuel storage arrangement 100.

The gaseous fuel storage arrangement 100 may comprising a venting line 140 arranged in the storage housing 110 for venting the storage housing 110. The venting line 140 may additionally comprise a venting valve 162 arranged in the venting line 140 and being configurable in an open position for enabling venting of the storage housing 110 to the venting line 140, and in a closed position for preventing venting of the storage housing 110 to the venting line 140. Thus, gas within the storage housing 110, such as gas (or air) between inner walls of the storage housing 110 and outer walls of the gaseous fuel tanks 110*a*, 110*b*, 110*c*, can be vented out of the storage housing 110 in a controllable manner. For example, the control unit 17 may be configured to control the venting valve 162 in the closed position in response to a demand for quicker heating of the storage housing 110 and/or the gaseous fuel tanks 110*a*, 110*b*, 110*c* arranged inside the storage housing 110. Moreover, in case a quicker venting of storage housing 110 is sought, the control unit 17 may be configured to control the venting valve 162 in the open position, e.g. in response to the determined storage gas temperature is above the second predefined temperature threshold.

As shown in FIG. 2, the gaseous fuel storage arrangement 100 may further comprises a separation wall 112 arranged in the storage housing 110 for dividing the storage housing 110 into a first storage compartment 114 and a second storage compartment 116. In the example of FIG. 2, the outlet 130*b*, 132*b* of the first and/or second exhaust gas transportation line 130, 132 is arranged in the second storage compartment 116. The separation wall 112 may e.g. be arranged to sealingly separate the first and second storage compartments 114, 116 such that not gas (or air) within the storage housing 110, except of the gaseous fuel within the first, second and third gaseous fuel tanks 110*a*, 110*b*, 110*c*, cannot flow between the first and second storage compartments 114, 116. For examples in which the separation wall 112 is present in the gaseous fuel storage arrangement 100, the previously mentioned venting line 140 and optional venting valve 162, is preferably arranged to vent the second storage compartment 116, as indicated by the dotted line of the venting line 140. However, the separation wall 112 may alternatively comprises an opening, such as a venting opening, through which the exhaust gas may flow between the first and second storage compartments 114, 116, wherein the venting line 140 and optional venting valve 162, is alternatively or additionally arranged to vent the first storage compartment 114.

As shown in FIG. 2, the first, second and third gaseous fuel tanks 110*a*, 110*b*, 110*c* are arranged in the first storage compartment 114, and the second storage compartment 116 is arranged as a thermal buffer. Thus, the second storage compartment 116 may be heated by the exhaust gas, and the separation wall 112 used to transfer heat between second storage compartment 116 and the first storage compartment 114. For example, the second storage compartment 116 may be heated to above the second predefined temperature threshold, and the control unit 17 may thus be configured to, in response to the determined storage gas temperature (e.g. that of the first storage compartment 114 or of the first gaseous fuel tank 110*a*) being above the second predefined temperature threshold, control the controllable valve 160 in the open position. The heating of the first storage compartment 114 or of the first, second and third gaseous fuel tanks 110*a*, 110*b*, 110*c* arranged in the first storage compartment 114 may then be controlled by heat conduction through the separation wall 112.

The gaseous fuel storage arrangement 100 may comprise a buffer tank 170 arranged downstream of the controllable supply valve 122. The buffer tank 170 may be configured to at least temporarily store gaseous fuel between the first, second and third gaseous fuel tanks 110*a*, 110*b*, 110*c* and the combustion engine 10 and/or fuel cell 11. As seen in FIG. 2, the buffer tank 170 is arranged in the second storage compartment 116. The buffer 170 may be made of steel, or a material comprising at least 50% iron (Fe). Thus, the material of the buffer tank 170 can withstand high temperatures. Optionally, the second storage compartment is free of any gaseous fuel tanks, such as the buffer tank 170. Regardless, the controllable supply valve 122 may be arranged in storage housing 110, such as e.g. in the second storage compartment 116. Moreover, as shown in FIG. 2, the gaseous fuel supply line 120 may be arranged to at least partly extends through the second storage compartment 116. Hereby, the gaseous fuel may be heated as it is transported to the combustion engine 10 and/or fuel cell 11.

It should be noted that the separation wall 112 is optional, and may be omitted. Moreover, the buffer tank 170 and the controllable supply valve 122 need not to be arranged in the storage housing 110. Thus, in some examples, the storage housing 110 comprises a single compartment in which the one or more gaseous fuel tanks 110*a*, 110*b*, 110*c* is arranged.

The gaseous fuel storage arrangement 100 and the combustion engine 10 or fuel cell 11 may together with the exhaust gas system 15 for an engine system 2. The exhaust gas system 15 may further comprise a backpressure valve 164 arranged in a downstream portion 16*b* of the exhaust gas line 16. The backpressure valve 164 is configured to control the backpressure in the exhaust gas line 16 of the exhaust gas system 15. For example, the control unit 17 may be configured to control the backpressure valve 164 to adjust the gas pressure at the inlet 130*a*, 132*a* of the first and/or second exhaust gas transportation line 130, 132. Hereby, the temperature, and/or the flow, of exhaust gas in the first and/or second exhaust gas transportation line 130, 132 may be further controlled.

Example 1. A gaseous fuel storage arrangement for a combustion engine or fuel cell of a vehicle having an exhaust gas system, the gaseous fuel storage arrangement comprising: a storage housing and a gaseous fuel tank arranged inside the storage housing; an exhaust gas transportation line extending from the exhaust gas system to the storage housing; a controllable valve arranged in the exhaust gas transportation line, the controllable valve being configurable in an open position for enabling supply of exhaust gas to the storage housing via the exhaust gas transportation line, and in a closed position for preventing supply of exhaust gas to the storage housing via the exhaust gas transportation line; and a control unit configured to determine an exhaust gas temperature in the exhaust gas system, and to determine a storage gas temperature in the storage housing, and in response to the determined storage gas temperature being below a first predefined temperature threshold and below the determined exhaust gas temperature, control the controllable valve in the open position.

Example 2. The gaseous fuel storage arrangement of example 1, wherein the control unit is further configured to, in response to the determined storage gas temperature being above a second predefined temperature threshold, control the controllable valve in the closed position.

Example 3. The gaseous fuel storage arrangement of any of examples 1-2, further comprising a venting line arranged in the storage housing for venting the storage housing.

Example 4. The gaseous fuel storage arrangement of example 3, further comprising a venting valve arranged in the venting line and being configurable in an open position for enabling venting of the storage housing to the venting line, and in a closed position for preventing venting of the storage housing to the venting line.

Example 5. The gaseous fuel storage arrangement of examples 2 and 4, wherein the control unit is configured to, in response to the determined storage gas temperature being above the second predefined temperature threshold, control the venting valve in the open or closed position.

Example 6. The gaseous fuel storage arrangement of any of examples 1-5, further comprising a separation wall arranged in the storage housing for dividing the storage housing into a first storage compartment and a second storage compartment, wherein an outlet of the exhaust gas transportation line is arranged in the second storage compartment.

Example 7. The gaseous fuel storage arrangement of example 6, wherein the gaseous fuel tank is arranged in the first storage compartment, and the second storage compartment is arranged as a thermal buffer wherein the separation wall is arranged to transfer heat between second storage compartment and the first storage compartment.

Example 8. The gaseous fuel storage arrangement of example 6, wherein the gaseous fuel tank is arranged in the second storage compartment.

Example 9. The gaseous fuel storage arrangement of any of examples 6-8, further comprising a gaseous fuel supply line for supplying gaseous fuel to the combustion engine or fuel cell, wherein the gaseous fuel supply line at least partly extends through the second storage compartment.

Example 10. The gaseous fuel storage arrangement of any of examples 1-9, further comprising a first temperature sensor arranged in the exhaust gas system, and a second temperature sensor arranged in the storage housing between a storage housing wall of the storage housing and the gaseous fuel tank or inside the gaseous fuel tank, wherein the first and second temperature sensors are configured to transmit temperature data to the control unit.

Example 11. The gaseous fuel storage system of any of examples 1-10, wherein the gaseous fuel tank stores pressurized hydrogen.

Example 12. The gaseous fuel storage arrangement of any of examples 1-11, wherein the exhaust gas transportation line includes a filter for removing particulates from the exhaust gas before it enters the storage housing.

Example 13. The gaseous fuel storage arrangement of any of examples 1-12, wherein a majority of the gaseous fuel tank is made of carbon fiber or a carbon fiber composite.

Example 14. An engine system for a vehicle comprising: the gaseous fuel storage arrangement of any of examples 1-13; a combustion engine or fuel cell for providing propulsion power of the vehicle; an exhaust gas system arranged downstream of the combustion engine or fuel cell, the exhaust gas system being arranged to transport exhaust gas to the atmosphere.

Example 15. The engine system of example 14, wherein the exhaust gas system comprises: an exhaust gas line comprising an upstream portion for receiving exhaust gas from the combustion engine or fuel cell, a downstream portion for discharging the exhaust gas to the atmosphere, wherein an inlet of the exhaust gas transportation line is arranged in an intermediate portion arranged between the upstream and downstream portions of the exhaust gas line; a backpressure valve arranged in a downstream portion of the exhaust gas line, wherein the control unit is configured to control the backpressure valve to adjust the gas pressure at the inlet of the exhaust gas transportation line.

Example 16. The engine system of any of examples 14-15, wherein the exhaust gas system comprises an emission reducing component for cleaning the exhaust gas, and wherein an inlet of the exhaust gas transportation line is arranged in the exhaust gas system upstream of the emission reducing component.

Example 17. The engine system of any of examples 14-15, wherein the exhaust gas system comprises an emission reducing component for cleaning the exhaust gas, and wherein an inlet of the exhaust gas transportation line is arranged in the exhaust gas system downstream of the emission reducing component.

Example 18. The engine system of any of examples 14-17, wherein the combustion engine is a clean combustion engine such as a hydrogen combustion engine.

Example 19. The engine system of any of examples 14-17, wherein the combustion engine is a hydrogen high pressure direct injection engine.

Example 20. A vehicle comprising the gaseous fuel storage arrangement according to any of examples 1-13 or the engine system of any of examples 14-19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A gaseous fuel storage arrangement for a combustion engine or fuel cell of a vehicle having an exhaust gas system, the gaseous fuel storage arrangement comprising:

a storage housing and a gaseous fuel tank arranged inside the storage housing;

an exhaust gas transportation line extending from the exhaust gas system to the storage housing;

a controllable valve arranged in the exhaust gas transportation line, the controllable valve being configurable in an open position for enabling supply of exhaust gas to the storage housing via the exhaust gas transportation line, and in a closed position for preventing supply of exhaust gas to the storage housing via the exhaust gas transportation line; and a control unit configured to determine an exhaust gas temperature in the exhaust gas system, and to determine a storage gas temperature in the storage housing, and in response to the determined storage gas temperature being below a first predefined temperature threshold and below the determined exhaust gas temperature, control the controllable valve in the open position.

2. The gaseous fuel storage arrangement of claim 1, wherein the control unit is further configured to, in response to the determined storage gas temperature being above a second predefined temperature threshold, control the controllable valve in the closed position.

3. The gaseous fuel storage arrangement of claim 2:

further comprising a venting valve arranged in the venting line and being configurable in an open position for enabling venting of the storage housing to the venting line, and in a closed position for preventing venting of the storage housing to the venting line;

wherein the control unit is configured to, in response to the determined storage gas temperature being above the second predefined temperature threshold, control the venting valve in the open or closed position.

4. The gaseous fuel storage arrangement of claim 1, further comprising a venting line arranged in the storage housing for venting the storage housing.

5. The gaseous fuel storage arrangement of claim 4, further comprising a venting valve arranged in the venting line and being configurable in an open position for enabling venting of the storage housing to the venting line, and in a closed position for preventing venting of the storage housing to the venting line.

6. The gaseous fuel storage arrangement of claim 1, further comprising a separation wall arranged in the storage housing for dividing the storage housing into a first storage compartment and a second storage compartment, wherein an outlet of the exhaust gas transportation line is arranged in the second storage compartment.

7. The gaseous fuel storage arrangement of claim 6, wherein the gaseous fuel tank is arranged in the first storage compartment, and the second storage compartment is arranged as a thermal buffer wherein the separation wall is arranged to transfer heat between second storage compartment and the first storage compartment.

8. The gaseous fuel storage arrangement of claim 6, wherein the gaseous fuel tank is arranged in the second storage compartment.

9. The gaseous fuel storage arrangement of claim 6, further comprising a gaseous fuel supply line for supplying gaseous fuel to the combustion engine or fuel cell, wherein the gaseous fuel supply line at least partly extends through the second storage compartment.

10. The gaseous fuel storage arrangement of claim 1, further comprising a first temperature sensor arranged in the exhaust gas system, and a second temperature sensor arranged in the storage housing between a storage housing wall of the storage housing and the gaseous fuel tank or inside the gaseous fuel tank, wherein the first and second temperature sensors are configured to transmit temperature data to the control unit.

11. The gaseous fuel storage system of claim 1, wherein the gaseous fuel tank stores pressurized hydrogen.

12. The gaseous fuel storage arrangement of claim 1, wherein the exhaust gas transportation line includes a filter for removing particulates from the exhaust gas before it enters the storage housing.

13. The gaseous fuel storage arrangement of claim 1, wherein a majority of the gaseous fuel tank is made of carbon fiber or a carbon fiber composite.

14. A vehicle comprising the gaseous fuel storage arrangement of claim 1.

15. The engine system of claim 14, wherein the exhaust gas system comprises:

an exhaust gas line comprising an upstream portion for receiving exhaust gas from the combustion engine or fuel cell, a downstream portion for discharging the exhaust gas to the atmosphere, wherein an inlet of the exhaust gas transportation line is arranged in an intermediate portion arranged between the upstream and downstream portions of the exhaust gas line; and a backpressure valve arranged in a downstream portion of the exhaust gas line;

wherein the control unit is configured to control the backpressure valve to adjust the gas pressure at the inlet of the exhaust gas transportation line.

16. The engine system of claim 14, wherein the exhaust gas system comprises an emission reducing component for cleaning the exhaust gas, and wherein an inlet of the exhaust gas transportation line is arranged in the exhaust gas system upstream of the emission reducing component.

17. The engine system of claim 15, wherein the exhaust gas system comprises an emission reducing component for cleaning the exhaust gas, and wherein an inlet of the exhaust gas transportation line is arranged in the exhaust gas system downstream of the emission reducing component.

18. The engine system of claim 15, wherein the exhaust gas system comprises an emission reducing component for cleaning the exhaust gas, and wherein an inlet of the exhaust gas transportation line is arranged in the exhaust gas system downstream of the emission reducing component.

19. The engine system of claim 15, wherein the combustion engine is a clean combustion engine such as a hydrogen combustion engine.

20. The engine system of claim 15, wherein the combustion engine is a hydrogen high pressure direct injection engine.

21. A vehicle comprising the engine system of claim 15.

* * * * *